(12) United States Patent
Kumakura

(10) Patent No.: US 6,631,111 B1
(45) Date of Patent: Oct. 7, 2003

(54) RECORDING AND REPRODUCING APPARATUS PROVIDED WITH TELETEXT RECORDING CAPABILITY

(75) Inventor: Yasushi Kumakura, Tochigi (JP)

(73) Assignee: Aiwa Co., Ltd., Tokyo (JP)

( * ) Notice: Subject to any disclaimer, the term of this patent is extended or adjusted under 35 U.S.C. 154(b) by 0 days.

(21) Appl. No.: 09/529,740
(22) PCT Filed: Oct. 30, 1997
(86) PCT No.: PCT/JP97/03970
§ 371 (c)(1),
(2), (4) Date: Jun. 12, 2000
(87) PCT Pub. No.: WO99/23660
PCT Pub. Date: May 14, 1999

(51) Int. Cl.$^7$ .................................................. G11B 5/09
(52) U.S. Cl. ................................ 369/59.25; 369/124.07
(58) Field of Search ........................... 369/47.15, 47.16, 369/47.19, 47.2, 47.21, 47.23, 47.24, 59.25, 59.27, 124.07, 124.09

(56) References Cited

U.S. PATENT DOCUMENTS 5,497,372 A    3/1996   Nankoh et al.

FOREIGN PATENT DOCUMENTS

| DE | 44 14 298 | 10/1995 |
| DE | 197 08 278 | 9/1997 |
| EP | 0 823 709 | 2/1998 |
| GB | 2 258 102 | 1/1993 |
| JP | 03132230 | 6/1991 |
| JP | 07045050 | 2/1995 |
| JP | 07262752 | 10/1995 |

*Primary Examiner*—Paul W. Huber
(74) *Attorney, Agent, or Firm*—Smith-Hill and Bedell

(57) ABSTRACT

A recording and reproducing apparatus with a teletext recording capability comprises an FM tuner (11) for receiving teletext with text information multiplexed with an FM signal; a text information decoder (21) for extracting the text information from the output of the FM tuner (11); a RAM (3) for temporarily storing the text information from the text information decoder (21); an audio circuit (41) for performing an audio signal processing based on the output of the FM tuner (11); and a recording/reproducing means (5) for recording an audio signal from the audio circuit (41) in a mini disc (6) with recording and reproducing capabilities and reproducing the audio signal from the disc; whereby, after recording the audio signal in the mini disc (6), a content of the text information preselected as additional information to the audio signal is read out from the RAM (3) and automatically recorded in a predetermined area of the mini disc (6).

2 Claims, 6 Drawing Sheets

FIG. 5

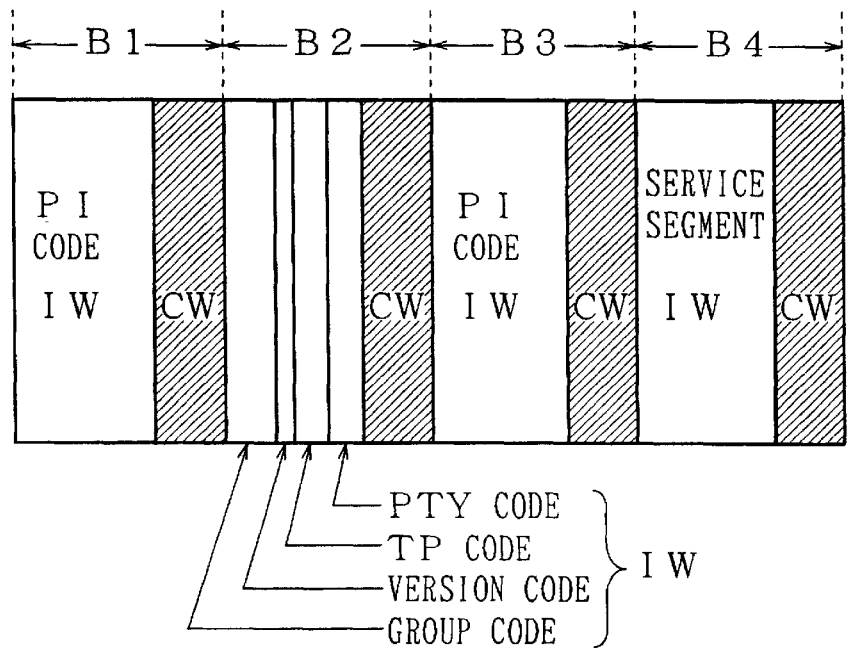

FIG. 6

| APPLICATION | GROUP TYPE INCLUDING INFORMATION | RECOMMENDED MINIMUM REPETITION RATE(1/SECOND) |
|---|---|---|
| STATION IDENTIFICATION CODE (PI) | ALL GROUPS | 11 |
| STATION NAME SERVICE (PS) | 0A, 0B | 1 |
| PROGRAM TYPE CODE (PTY) | ALL GROUPS | 11 |
| TRAFFIC INFORMATION IDENTIFICATION CODE (TP) | ALL GROUPS | 11 |
| SWITCHING FREQUENCY INFORMATION (AF) | 0A | 4 |
| TRAFFIC INFORMATION ANNOUNCEMENT (TA) | 0A, 0B, 15B | 4 |
| DECODER IDENTIFICATION CODE (DI) | 0A, 0B, 15B | 1 |
| MUSIC/SPEECH CODE (M/S) | 0A, 0B, 15B | 4 |
| PROGRAM TYPE NUMBER CODE (PIN) | 1A, 1B | 1 |
| RADIO TEXT (RT) | 2A, 2B | 0.2 |

RECORDING AND REPRODUCING APPARATUS PROVIDED WITH TELETEXT RECORDING CAPABILITY

TECHNICAL FIELD

The present invention relates to a recording and reproducing apparatus provided with a teletext recording capability for recording an audio signal of teletext such as RDS (Radio Data System) in a mini disc and then automatically recording the contents of text information to be superimposed to this teletext audio signal into a predetermined memory area of the mini disc.

BACKGROUND ART

Recently, a communication method is more frequently used than before in which text information is transmitted by FM multiplex data broadcasting in the so-called visible radio in Japan and the RDS broadcast receiver. Teletext broadcasting denotes a system in which station information, traffic information, tuning information, and other message data are inserted (superimposed) in the frequency band of radio broadcasting for broadcasting. A radio receiver (hereafter referred to as an audio device having a teletext receiving capability) capable of receiving teletext has a display device or the like to display text information included in the message data.

The so-called RDS is disclosed in Japanese Non-examined Patent Publication No. 8-2593078 titled "Automatic Tone Quality Adjusting Apparatus for RDS Radio Receiver" for example. In the disclosed apparatus, the gain of a tone quality adjusting circuit is automatically adjusted by use of a program type code (program type; PTY) included in the message data currently being received. The visible radio is disclosed in Japanese Non-examined Patent Publication No. 5-145500 titled "FM Broadcast Multiplexed Signal Decoding Method." In the disclosed decoding method, an error in information words included in the currently received message data is corrected by use of a check word thereof.

Regarding the recording and reproducing apparatus, an audio device (MD recording and reproducing device) having a magneto-optical disc enabled for recording and reproducing (Mini Disc: hereafter simply referred to as a mini disc) is already commercially available. The MD recording and reproducing device can record recorded information such as audio signals and text information as information additional to the recorded information.

The MD recording and reproducing device is provided with an input means such as a jog dial with which text information such as a disc title and a track title can be manually inputted in the information recorded in a mini disc. For example, by rotating this job dial, the user can input numerals one by one. Further, by switching input mode, the user can input alphabets in a capital letter or a small letter and symbols. This MD recording and reproducing device is also provided with a display device. Using this display device, the above-mentioned text information can be displayed at reproduction of recorded information.

Meanwhile, the user of the audio device having teletext receiving capability and the MD recording and reproducing device may desire the following:

(1) record an audio signal sent by teletext in a mini disc and reproduce the audio signal later;

(2) record the text information about a received station, a category of received content, and so on as additional information to an audio signal; and (3) display the content of the additional information as the text information while reproducing the audio signal recorded in the mini disc.

However, in case of combining the audio device having teletext receiving capability and the MD recording and reproducing device to satisfy the above-mentioned requirements, it causes following problems.

For example, when recording the above-mentioned additional information at receiving teletext, the user must read and make a note of text information displayed on the display device of the audio device having teletext receiving capability and then write the note to the MD recording and reproducing apparatus.

Although the above-mentioned operation is advantageous in that the user can use the input means of the MD recording and reproducing device to input the text information in a desired form, the user must take the trouble of manually inputting numerals and alphabets by operating the jog dial. Also, because the switching between input modes requires time to some degree, writing of the additional information to the MD recording and reproducing device at teletext recording significantly decreases ease of operation.

It is therefore an object of the present invention to solve the above-mentioned problems by providing a recording and reproducing apparatus provided with a teletext recording capability for recording an audio signal received by teletext in a mini disc and then automatically recording multiplexed text information at the reception of that teletext in a predetermined memory area of the mini disc as additional information.

DISCLOSURE OF THE INVENTION

A recording and reproducing apparatus provided with a teletext recording capability comprises: a receiving means for receiving teletext with text information multiplexed with an FM signal; a text information decoding means for extracting the text information from the output of the receiving means; a signal processing means for performing audio signal processing based on the output of the receiving means; and a recording and reproducing means for recording an audio signal from the signal processing means in a disc with recording and reproducing capabilities and reproducing the audio signal from the disc; wherein, after the audio signal is recorded in the disc, the text information is recorded in a predetermined area of the disc as additional information to the audio signal.

According to the apparatus of the present invention, the audio signal transmitted by teletext is recorded in a disc and then the text information of the audio signal is automatically recorded in a predetermined area of the disc as additional information to the audio signal.

The novel constitution eliminates the necessity for a user to manually input a station name, a program category, a description of program content, and so on recorded in the disc as the additional information to the audio signal recorded in the disc. Moreover, the user can display the additional information on a display device by the text information read out from the disc at reproduction of the audio signal, thereby confirming the content of the additional information.

Thus, when recording the audio signal transmitted by teletext in the disc, the content of the text information is also automatically written in a predetermined area of the disc, thereby the input operation of user is significantly saved.

BRIEF DESCRIPTION OF THE DRAWINGS

FIG. 5 is a format of version B group.

FIG. 6 shows a relationship between content of the message data, a group type including the content, and a repeat type.

BEST MODE FOR CARRYNG OUT THE INVENTION

(1) First Embodiment

The first embodiment is provided with a memory for temporarily storing text information multiplexed with an FM signal at receiving teletext and a selecting means for selecting beforehand content of text information to be read out from this memory. Of the text information multiplexed with the FM signal, the content of the teletext information selected beforehand as additional information to an audio signal is automatically recorded, after recording the audio signal transmitted by teletext in a mini disc, into a predetermined area of the mini disc.

Figure 1:
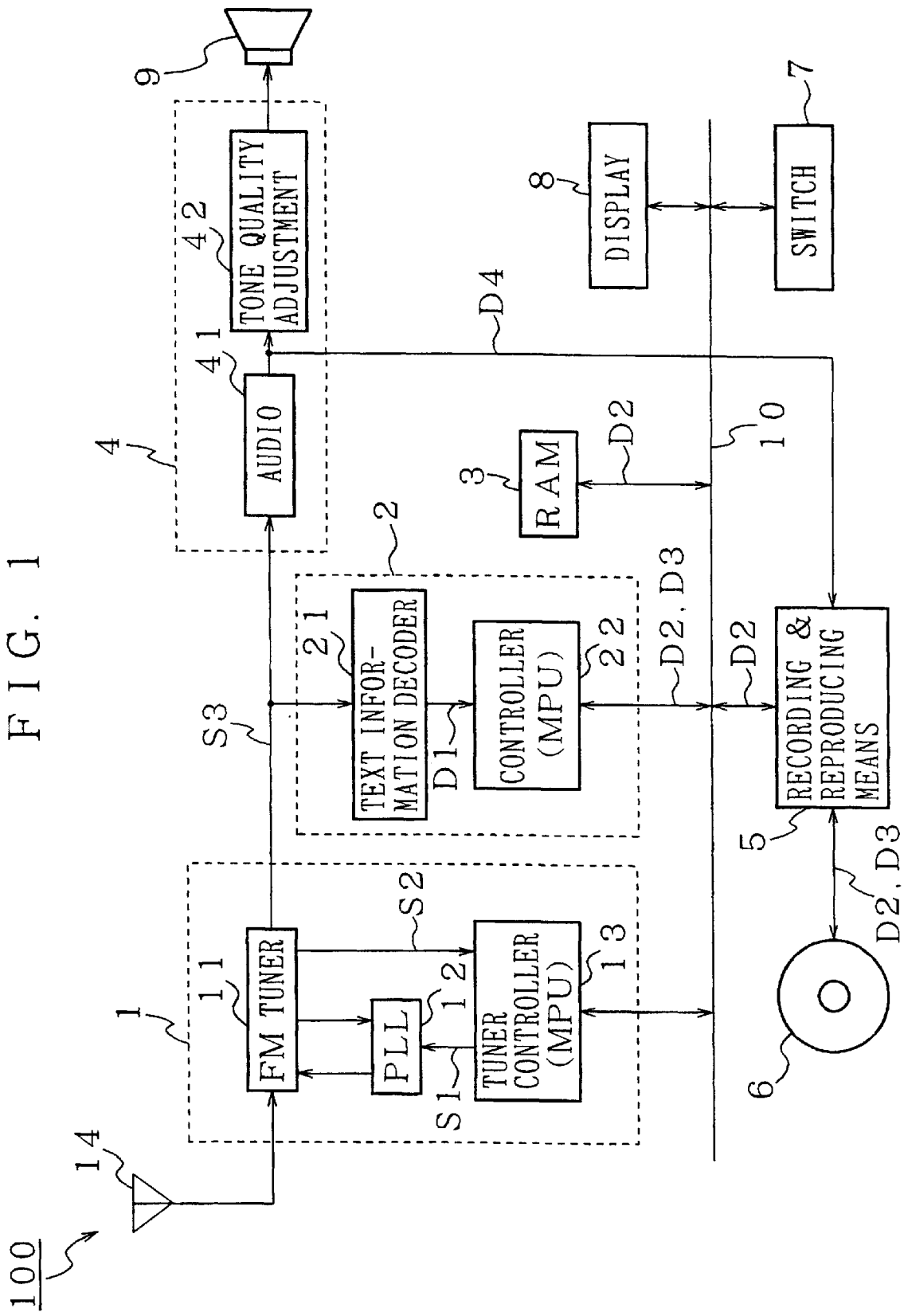
FIG. 1 is a block diagram illustrating a constitution of a recording and reproducing apparatus provided with a teletext recording capability associated with the present invention.

A recording and reproducing apparatus 100 provided with a teletext recording capability associated with the present invention has an antenna 14 shown in FIG. 1. This antenna 14 is connected to a receiving means 1 for receiving teletext. An FM signal of this teletext is multiplexed with text information. The receiving means 1 has an FM tuner 11, a PLL (Phase Locked Loop) circuit 12, and a tuner controller 13. This FM tuner 11 is based on PLL synthesizer.

In the receiving means 1, on the basis of an intermediate frequency detecting signal S2 outputted from the FM tuner 11, a frequency setting signal S1 is given from the tuner controller 13 to the PLL circuit 11. The tuner controller 13 has a microcomputer (MPU). A tuning frequency for selecting a station is determined by this frequency setting signal S1. An FM multiplexed signal received by the antenna 14 is demodulated by the FM tuner 11 into a composite signal S3 to be outputted.

The composite signal S3 has an audio signal and text data D1 AM-modulated by a 57 KHz subcarrier. The text data D1 is outputted repeatedly for each station and the content of the text data D1 changes every time a certain time passes. According to European Broadcasting Union, the text data D1 has message data such as a station identification (PI) code, a program type (PTY) code, a traffic information announcement (TA) code, and a radio text (RT).

A format of this message data will be described with reference to FIG. 3. The station identification (PI) code, the program type (PTY) code, and the radio text (RT) included in this message data provide the text information D2.

The output stage of receiving means 1 is connected to a text information decoding means 2 and a signal processing means 4. The text information decoding means 2 has a text information decoder 21 and a controller 22. The text information decoder 21 connected to the output stage of the FM tuner 11 decodes the composite signal S3 to the text data D1.

The output stage of text information decoder 21 is connected to the controller 22. The controller 22 extracts the text information D2 from the text data D1 with each of the codes in the above-mentioned message data used as an address. The controller 22 has a microcomputer (MPU).

This controller 22 is connected to a data bus 10. The data bus 10 is connected to a RAM 3 that is also available as a work memory and temporarily stores the text information D2 extracted at reception of the teletext. Further, this data bus 10 is connected to a switch 7 that functions as a selecting means. The switch 7 has an MD recording mode switching button, a recording mode selecting button, and an MD recording button. The MD recording mode switching button is a mode switch for recording the teletext in a mini disc 6. The recording mode selecting button is a switch for selecting the recording mode to be described below. The MD recording button is a switch for starting recording in the mini disc 6.

In this example, when the recording mode selecting button is operated, the content of the text information D2 to be read out from the RAM 3, namely the recording mode of the text information D2 to be added to an audio signal S4, can be selected beforehand.

In this example, four recording modes are available as follows:

(1) recording both pieces of text information D2 associated with station name service (PS) code and radio text (RT);

(2) recording only the text information D2 associated with station name service (PS) code;

(3) recording only the text information associated with radio text (RT); and (4) not recording the text information D2. The user selects one of these four recording modes (1) through (4). The switch 7 may be a jog dial. When one of the recording modes is selected, the selection data D3 corresponding to the selected recording mode is outputted. When the MD recording button of the switch 7 is pressed, the text data D1 received at this point of time is temporarily stored in the RAM 3.

The output stage of FM tuner 11 is connected to an audio circuit 41 by which the composite signal S3 is separated into left-side and right-side stereo signals to be reproduced from a speaker 9 through a tone quality adjusting circuit 42. Here, a circuit configuration for processing only one audio signal S4 is shown.

The output stage of audio circuit 41 is connected to a recording and reproducing means 5 by which recording and reproduction of the audio signal S4 are performed with a mini disc 6. An example of the constitution of this recording and reproducing means 5 will be described with reference to FIG. 2. The recording and reproducing means 5 is connected to the data bus 10 in which the text information D2 and selection data D3 are transmitted. For example, in the recording and reproducing means 5, after the audio signal S4 is recorded in the mini disc 6, the text information D2 read out from the RAM 3 is recorded, as additional information to the audio signal S4, in a predetermined area of the mini disc 6 called a link sector based on the selection data D3. This area is called a UTOC (User Table Of Contents).

The data bus 10 is connected to a display 8 as a display means. The display 8 displays the text information D2 selected by the recording mode selecting button of the switch 7. For example, at reproduction of the audio signal S4, the text information D2 read out from the link sector of the mini disc 6 is displayed on the display 8. By looking at the display 8, the user can confirm the text information D2 added to the audio signal S4 at recording of the teletext.

Thus, according to the recording and reproducing apparatus 100 provided with a teletext recording capability of the present embodiment, the switch 7 is provided for selecting the recording mode of the text information D2 (read out from the RAM 3) to be recorded in the link sector of the mini disc 6. When the content of the text information D2 selected beforehand is read out from the RAM 3 based on the selection data D3 after the audio signal S4 is recorded in the mini disc 6, the content of the text information D2 is automatically recorded in the link sector of the mini disc 6 as the additional information to the audio signal S4.

Therefore, for the audio signal S4 to be recorded in the mini disc 6, the user do not need to manually input the station name, the program category, and description of program content at recording the teletext. And, at reproduction of the audio signal S4, the text information D2 read out from the mini disc 6 can be displayed on the display 8.

Figure 2:
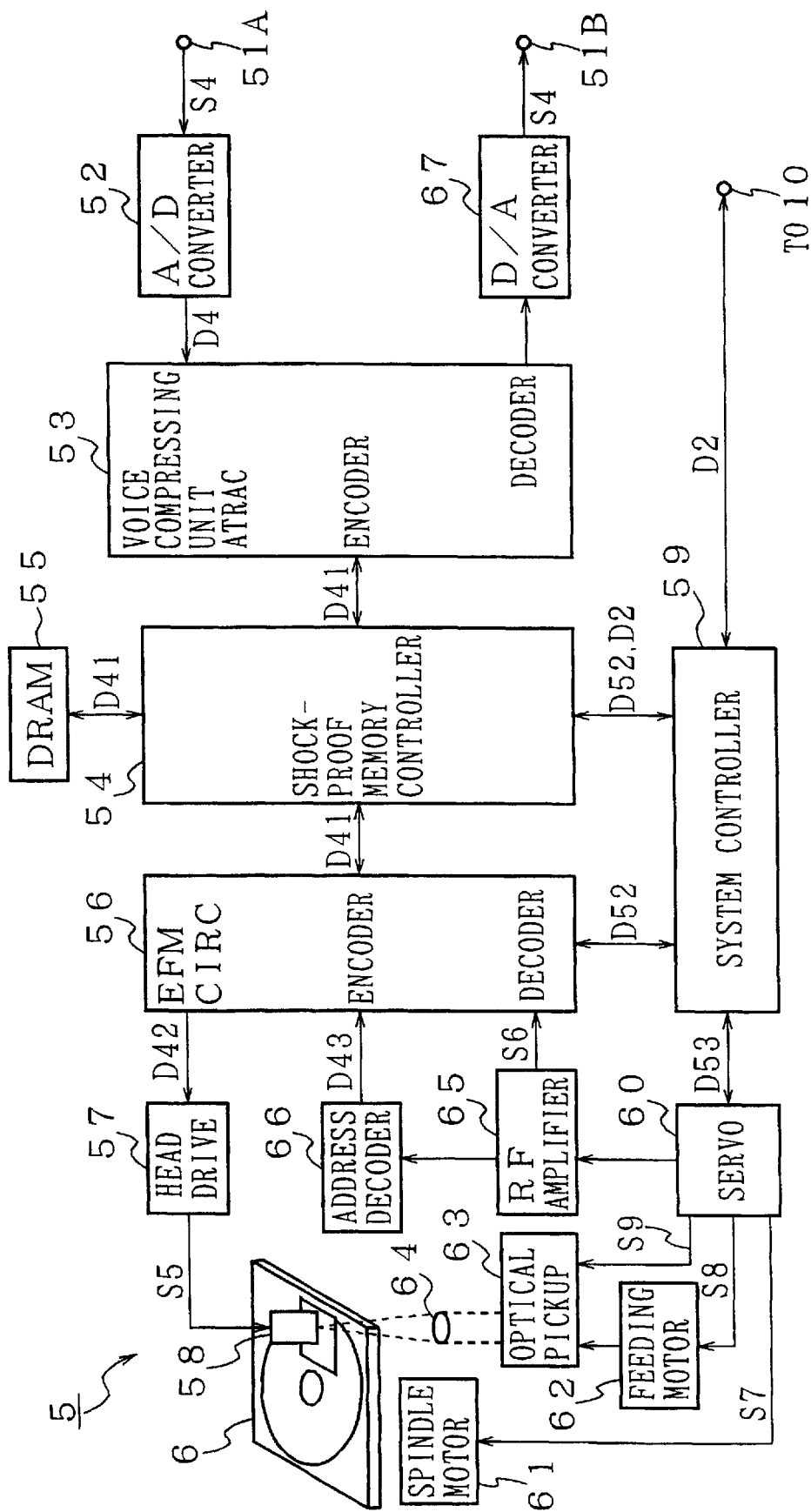
FIG. 2 is a block diagram illustrating a constitution of an MD recording and reproducing device.

The above-mentioned recording and reproducing means 5 has an input terminal 51A and an output terminal 51B shown in FIG. 2. The input terminal 51A is connected to an A/D converter 52 wherein the audio signal S4 coming from the audio circuit 41 is converted from analog to digital and the resultant audio data D4 of 8-bit for example is outputted.

The output stage of A/D converter 52 is connected to a voice compression unit 53. The voice compression unit 53 has an ATRAC (Adaptive TRansform Acoustic Coding) encoder and a decoder. The audio data D4 is compressed to ⅕ by the ATRAC encoder so as to delete, for example, inaudible frequencies for the human. The voice compression unit 53 is connected to a shock-proof memory control unit 54. Audio data D41 after compression (hereafter referred to as the compressed data) is temporarily stored in a DRAM 55 having a storage capacity of about 1-Mbit. The shock-proof memory control unit 54 is connected to an EFM (Eight to Fourteen Modulation) & CIRC (Cross Interleave Reed-Solomon Code) unit 56 wherein the 8-bit compressed data D41 read out from the DRAM 55 is modulated into 14-bit MD writing data D42.

The EFM & CIRC unit 56 is connected to a header drive circuit 57 wherein an MD writing signal S5 is generated based on the MD writing data D42. The output stage of head drive circuit 57 is connected to a recording head 58 wherein recording information associated with the audio signal S4 is recorded in the mini disc 6 by the MD writing signal S5.

On the other hand, the data bus 10 is connected to a system controller 59. After recording information is recorded in the mini disc 6, the text information D2 read out from the RAM 3 is processed by the shock-proof memory control unit 54 and the EFM & CIRC unit 56 that received control data D51 and D52 from the system controller 59. By this data processing, the MD writing data D42 associated with the text information D2 is converted to the MD writing signal S5 in the head drive circuit 57. The text information D2 is recorded in the link sector of the mini disc 6 by the recording head 58 in which the MD writing signal S5 has been inputted.

The system controller 59 is connected to a servo circuit 60 wherein motor control signals S7 and S8 and a pickup control signal S9 are generated based on servo control data D53 and an RF detecting signal S6 received from the system controller 59. The output stage of servo circuit 60 is connected to a spindle motor 61, a feeding motor 62, and an optical pickup 63. The spindle motor 61 rotates the mini disc 6 based on a motor control signal S7 during recording or reproducing of the mini disc 6. Likewise, the feeding motor 62 moves the optical pickup 63 in the radial direction of the mini disc 6 based on a motor control signal S8.

In order to write an information, the optical pickup 63 heats up a spot on the mini disc 6 in a moment based on a pickup control signal S9. At this moment, a laser beam from the optical pickup 63 radiates the mini disc 6 through an objective lens 64. According to this radiation, the disc is heated up to the Curie temperature (about 180° C.) at which the disc loses its magnetic character. When the disc becomes a neutral state as a magnetic substance, a magnetic field is applied to the disc by the recording head 58 disposed on the side opposite to the optical pickup 63. When the disc cools down below the Curie temperature, the disc regains its magnetic character. Accordingly, recording is made in the disc placed between the recording head 58 and the optical pickup 63.

To read an information, the laser beam from the optical pickup 63 radiates the mini disc 6 through the objective lens 64. A reflected light from the mini disc 6 varies in a plane of polarization. The plane of polarization of the reflected light changes in the direction (of S-pole or N-pole) to which the disc is magnetized. The reflected light is detected by utilizing the change of the plane of polarization. This reflected light is outputted as a digital RF detecting signal S6 after being detected by an RF amplifier 65. Information-reading speed from the disc is approximately 1.4- Mbit/second.

The output stage of RF amplifier 65 is connected to an address decoder 66 by which a position data D43 for the optical pickup 63 is decoded based on the RF detecting signal S6. The EFM & CIRC unit 56, wherein the RF detecting signal S6 and the position data D43 are inputted, performs an error correction and a data demodulation on the RF detecting signal S6 based on the control data D52 sent from the system controller 59. The error-corrected and demodulated 8-bit demodulated data becomes the text information data D2 and the compressed audio data D41 and then is temporarily stored in the DRAM 55 via the shock-proof memory control unit 54. This temporary storing is for preventing a reading error of the text information D2 and a skip of sound at reproduction due to such as a jump of the optical pickup 63.

The text information D2 temporarily stored in the DRAM 55 is sent from the system controller 59 to the display 8 by way of the data bus 10 at the time of reproduction. The audio data D41 temporarily stored in the DRAM 55 is read out and sent to the voice compression unit 53 at an approximate speed of 0.3-Mbit/second.

In the voice compression unit 53, the audio data D41 is decoded to the uncompressed audio data D4 by the ATRAC decoder and then converted from digital to analog by a D/A converter 67. The converted audio signal S4 is outputted from the output terminal 51B to the audio circuit 41.

Consequently, in this apparatus 100, the audio signal S4 recorded at the time of teletext broadcasting is outputted from the speaker 9 and, at the same time, the text information D2 is displayed on the display 8 as an additional information to the audio signal S4.

According to European Broadcasting Union, the above-mentioned radio data system is applied to stereo or monaural FM and VHF broadcasting at 87.5 to 107.9 MHz.

Figure 3:
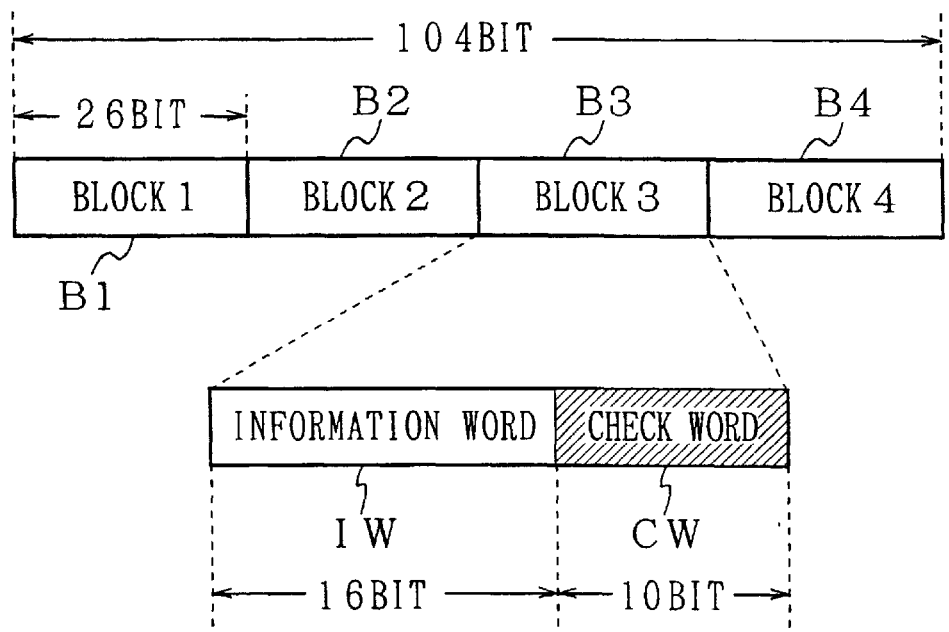
FIG. 3 is a format of message data associated with teletext.
Figure 4:
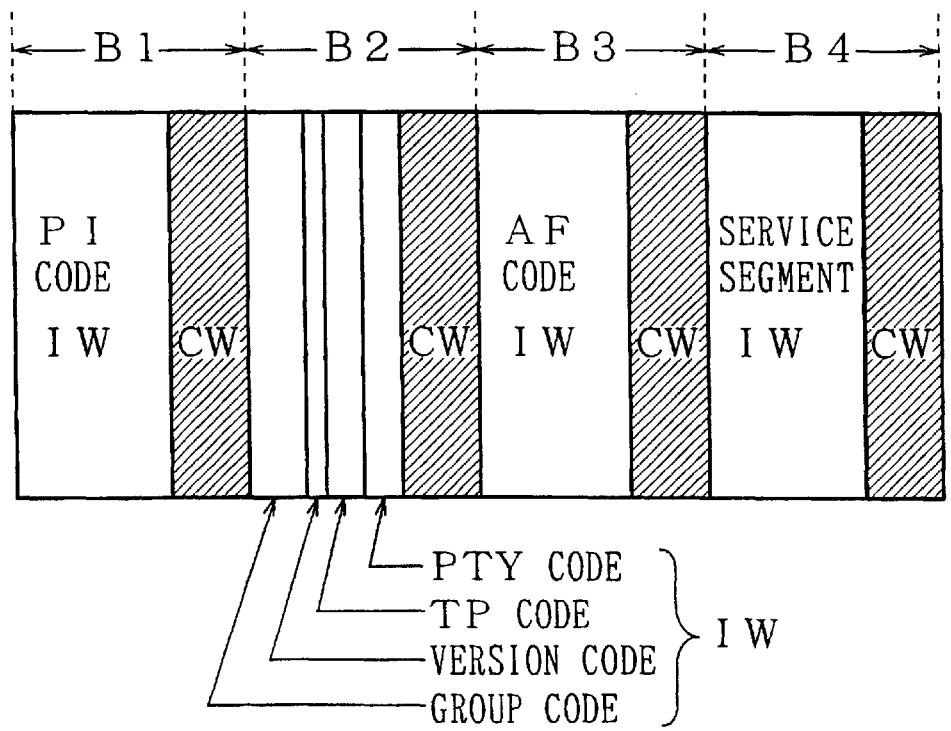
FIG. 4 is a data format of version A group.

FIGS. 3 and 4 show examples of formats of message data to be multiplexed at the time of European RDS broadcasting.

The message data shown in FIG. 3 has a data format with a unit of 104-bit. A one unit of the data is divided into four data blocks wherein each block is 26-bit. An information word is written in the first 16-bit of each block and a check word is written in the last 10-bit.

The message data are defined as two groups of version A and version B. Further, each group of the message data is divided into types 0 to 15. Currently, types 7 through 14 are undefined. In case of the message format of the version A group, a station identification (PI) code is written in the 16-bit of first block shown in FIG. 4. In the second block, a group type code is written in its 4-bit, a version code is written in its 1-bit, and a program type (PTY) code is written in its 5-bit. In the third block, switching frequency information (AF) code is written in its 16-bit.

In case of the message format of version B group, a station identification (PI) code is written in the first block shown in FIG. 5. In the second block, a group type code, a version code, a traffic information station identification (TP) code, and a program type (PTY) code are written. In the third block, the station identification (PI) code as that of the first block is written. Therefore, the switching frequency information (AF) code is not written in the data format of the version B group. This is because, if the version A group and the version B group are mixed for transmission, high-speed extraction of the text information D2 is performed by writing the station identification (PI) code in the third block.

FIG. 6 shows a relationship among the content of the message data, the group types including the content, and repetition rates. Here, the station identification (PI) code and the station name service (PS) code are always transmitted at the repetition rate shown in FIG. 6 when a teletext station is broadcasting a normal program.

For example, for the code station name service (PS) code, a maximum of eight characters are transmitted at a repetition rate of once every second in group type 0A. The station name service code is an information for telling listeners "which station the receiver is currently tuned in." In group type 0B, a maximum of eight characters are also transmitted at a repetition rate of once every second.

For the radio text (RT) code, a maximum of 64 characters are transmitted at a repetition rate of once every five seconds in group type 2A. The radio text code is an information for telling listeners "the title, composer, and so on of the music that the receiver is currently tuned in." In group type 2B, a maximum of 32 characters are transmitted at a repetition rate of once every five seconds.

Operations for recording the text information D2 at recording of teletext associated with the first embodiment of the present invention is described with reference to FIG. 7. In this embodiment, a liquid crystal display device is used as the display 8 by which one character is displayed by 5×7 pixels, the text information D2 of 11 characters is displayed in one screen, and a maximum of 50 characters are displayed with scrolling the displayed contents.

Figure 7:
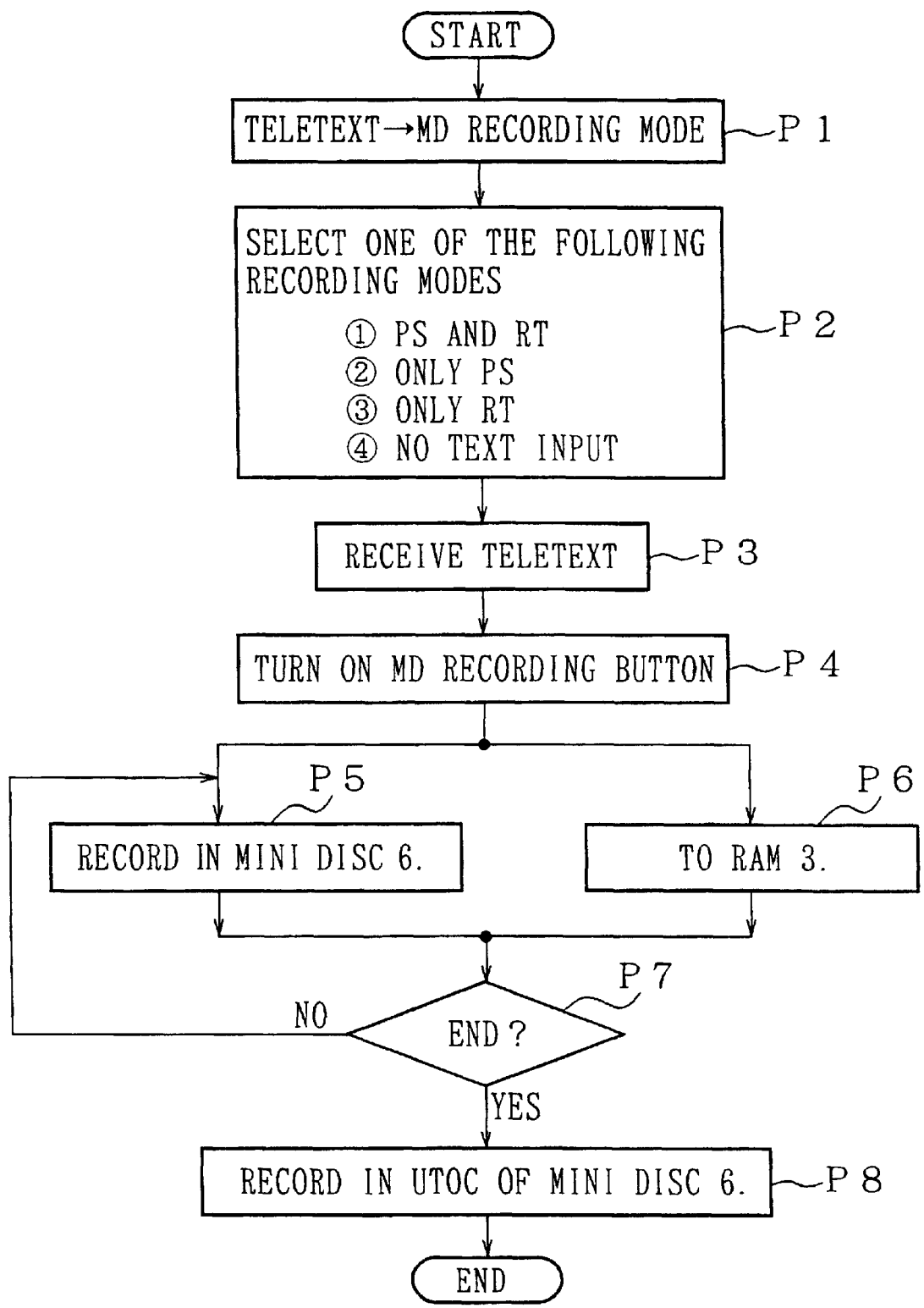
FIG. 7 is a flowchart describing recording of text information at teletext recording, practiced as a first embodiment of the present invention.

First, the user turns on the power supply of this apparatus and sets, in step P1 of the flowchart of FIG. 7, the MD recording mode in which a teletext can be recorded in the mini disc 6. Next, in step P2, the user selects one of the four recording modes. In the present embodiment, if the recording mode (1) is selected, the text information D2 of total 50 characters, wherein eight characters for displaying a station name, two characters for a space after that, and 40 characters for displaying a radio text (RT), is recorded in the link sector of the mini disc 6.

If the recording mode (2) is selected, the text information D2 for displaying only the station name composed of eight characters is recorded in the link sector of the mini disc 6. If the recording mode (3) is selected, the text information D2 for displaying the radio text (RT) of a maximum of 50 characters is recorded in the link sector of the mini disc 6. If the recording mode (4) is selected, no text information D2 is recorded. In this example, it is assumed that the user selects the recording mode (1) in step P2.

Next, in step P3, the user selects a teletext station desired and puts the audio signal of that station into a state in which the audio signal can be recorded in the mini disc 6 by receiving the FM signal of the station. At this stage, the text information decoder 21 decodes the composite signal S3 and a text data D1 is obtained. The text data D1 includes the station name service (PS) code, the program type (PTY) code, the traffic information announcement (TA) code, and the radio text (RT) (refer to FIG. 6). The decoded text data D1 is temporarily stored in the RAM 3 by the controller 22. The contents of the RAM 3 are updated as the teletext progresses.

Then, the user presses the MD recording button of the switch 7 in step P4 and then the recording and reproducing means 5 begins to record the audio signal S4 in the mini disc 6 in step 5. When the recording starts, the controller 22 extracts, in step P6, the text information D2 such as the preselected station name service (PS) code and the radio text (RT) from the text data D1 at the time of pressing the MD recording button. This text information D2 is temporarily saved in another memory area of the RAM 3. According to this, the text information D2 is now ready to be recorded in the mini disc 6 (a standby state).

The recording operation for the mini disc 6 is performed in a following manner. The audio signal S4 sent from the audio circuit 41 as shown in FIG. 2 is temporarily stored in the DRAM 55 via the A/D converter 52, the voice compression unit 53, and the shock-proof memory control unit 54. The 8-bit compressed audio data D41 read out from the DRAM 55 is modulated to 14-bit MD writing data D42 by the EFM & CIRC unit 56. The MD writing data D42 is converted, by the head drive circuit 57, to an MD writing signal S5 and the recording information associated with the audio signal S4 is sequentially recorded in the mini disc 6 by the recording head 58.

In step P7, the system controller 59 monitors end of recording. In the system controller 59, after the entire recording information has been recorded in the mini disc 6, operation proceeds to step P8, the text information D2 is recorded in the link sector of the mini disc 6 in the preselected recording mode (1). In this example, for the text information D2, the station name is recorded in eight characters and then, following two characters for blank space, the radio text (RT) such as a music title is recorded in 40 characters. Thus, a total of 50 characters are recorded in the link sector of the mini disc 6.

To be more specific, the text information D2 read out from the RAM 3 is converted to the MD writing data D42 by the shock-proof memory control unit 54 and the EFM & CIRC unit 56 both of which has received the control data D51 and D52 from the system controller 59. The MD writing data D42 associated with the text information D2 is converted to the MD writing signal S5 by the head drive circuit 57 and then recorded in the link sector of the mini disc 6 by the recording head 58. In this example, the portion of the radio text exceeding 40 characters is eliminated.

If the recording mode (2) is selected in step P2, only eight characters of the station name is recorded in the link sector of the mini disc 6 in step P8. If the recording mode (3) is selected in step P2, the radio text (RT) of a maximum of 50 characters is recorded in the link sector of the mini disc 6 in step P8. In this example, the portion of the radio text exceeding 50 characters is deleted. If the recording mode (4) is selected in step P2, the text information D2 is not recorded in step P7.

According to the present embodiment, after confirming the completion of recording of the audio signal S4 of teletext in the mini disc 6 in step P7, the content of the text information D2 can be automatically recorded in the link sector of the mini disc 6 in step P8 according to the recording mode preselected in step P2. And, at reproduction of the audio signal S4, the text information D2 read out from the mini disc 6 can be displayed on the display 8.

When the text information D2 is recorded in the recording mode (1), the station name is displayed in eight characters and then, following the blank space of two characters, the radio text (RT) such as a music title is displayed in 40 characters. For the text information D2 of 50 characters, the text information D2 is displayed in every 11 characters in one screen by scrolling the displayed contents.

When the text information is recorded in the recording mode (2), only eight characters of the station name is displayed on the display 8. When the text information D2 is recorded in the recording mode (3), the radio text (RT) of a maximum of 50 characters is displayed on the display 8 with scrolling the displayed contents.

(2) Second Embodiment

In the second embodiment, a recording mode is selected during reception of teletext and, after the audio signal has been recorded, the text information is recorded in the mini disc 6 based on the selected recording mode. The conditions for the display 8 are the same as those of the first embodiment.

Figure 8:
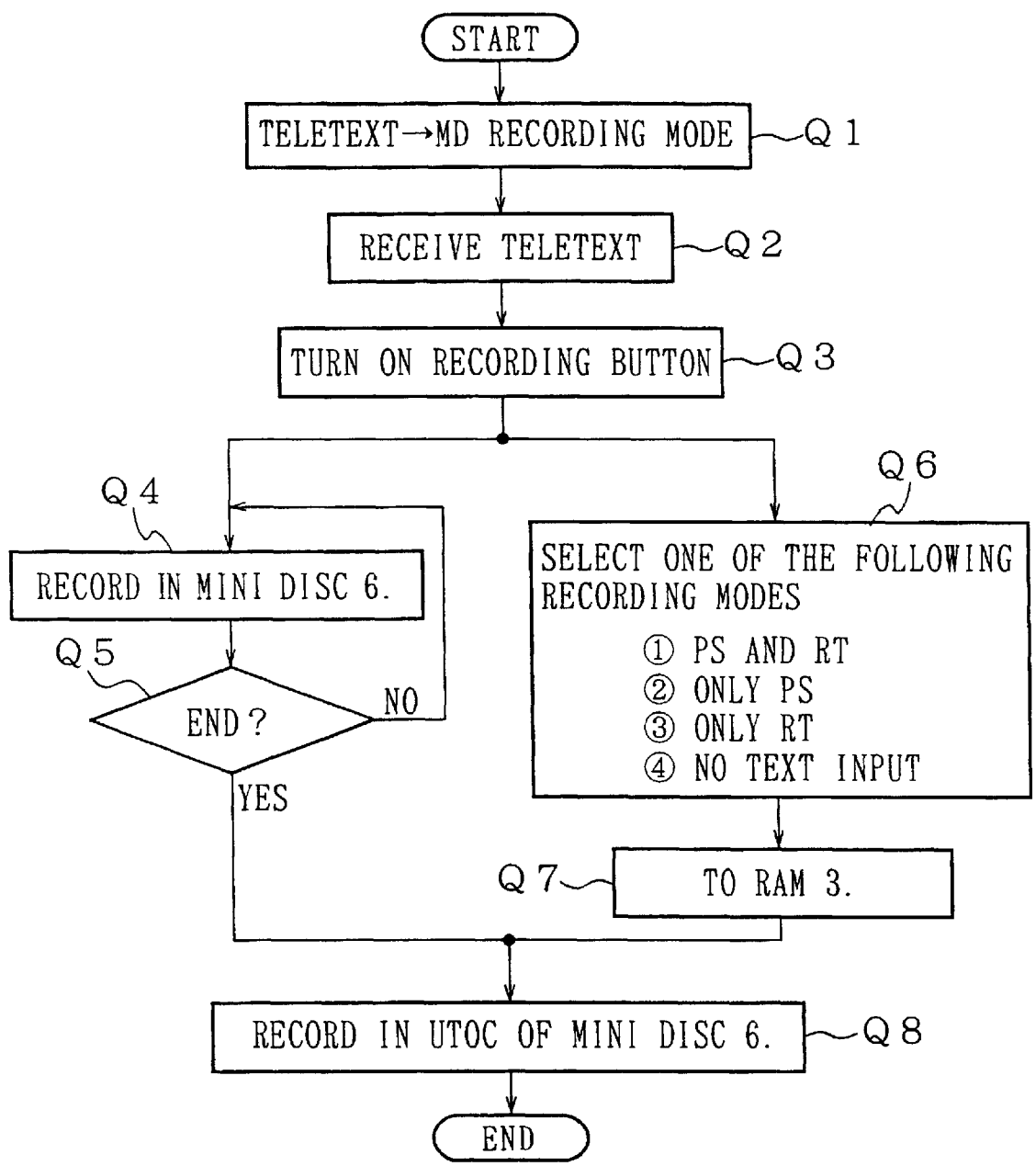
FIG. 8 is a flowchart describing recording of text information at teletext recording, practiced as a second embodiment of the present invention.

First, the user turns on the power supply of this apparatus and sets an MD recording mode in a manner similar to the one described in the first embodiment in step Q1 of the flowchart shown in FIG. 8. Then, the user selects a desired teletext station in step Q2 and receives the FM signal from the station. The user puts the received audio signal of that station into a state in which the audio signal can be recorded in the mini disc 6. At this time, the text information decoder 21 decodes the composite signal S3 and a text data D1 is obtained. The text information D2 to be added to the audio signal is undefined at this stage.

When the user presses the MD recording button of the switch 7 in step Q3, the system controller 59 begins to record the audio signal S4 in the mini disc 6 in step Q4. The recording operation to be performed here has been described above with reference to FIG. 2 and therefore the description is skipped. The end of this recording operation is monitored by the system controller 59 in step Q5.

Concurrently with the above-mentioned recording operation, the user selects one of the four recording modes in step Q6 before the broadcasting of that audio signal comes to an end. In this example, it is assumed that the recording mode (3) is selected by the user in order to record a station name and a radio text such as a music title and a composer, as an additional information.

The text information D2 associated with the radio text (RT) is extracted by the controller 22 from the test data D1 at the time of selecting the recording mode (3). The extracted text information D2 is temporarily stored in the RAM 3 by the controller 22 in step Q7. According to this embodiment, only the selected text information D2 may always be temporarily stored in the RAM 3. Therefore, it is enough to have a memory with a capacity capable of storing the text information D2 of up to 50 characters maximum.

Then, in the recording and reproducing means 5, after the entire recording information has been recorded in the mini disc 6, operation proceeds to step Q8, the text information D2 is recorded in the link sector of the mini disc 6 in the preselected recording mode (3). For the text information D2 in this example, the radio text (RT), such as a music title and a composer, expressed in 50 characters is read out from the RAM 3 and recorded in the link sector of the mini disc 6. The recording operation has already been described with reference to the first embodiment and therefore the description is not made here.

Thus, in the second embodiment, the recording mode (3) is selected in step Q6 during the recording of teletext in step Q2 and, after recording the audio signal, the text information D2 can be automatically recorded in the mini disc 6 based on this recording mode (3) in step Q8.

Consequently, at the reproduction of the audio signal S4, the text information D2 read out from the mini disc 6 can be displayed on the display 8 in a manner similar to that in the first embodiment.

For the text information D2 in each of the above-mentioned embodiments, the example of recording a maximum of 50 characters has been described by using the station name service (PS) code and the radio test (RT) as an example but the maximum number of character is not, of course, restricted to 50. The present invention may also be applied in case of recording about 200 characters of the text in-formation D2 including the program type (PTY) code in the mini disc 6.

It should be noted that, in the Japanese visible radio, a kanji information is also transmitted. In this case, the user can record the kanji information as an additional information to the audio signal 4 by increasing the recording capacity of the mini disc 6. In this point of view, the present invention is extremely suitable for applying to an audio device for receiving the teletext of the European system utilizing an alphabetic and a symbolic characters.

Industrial Applicability

As described above, the recording and reproducing apparatus having a teletext recording capability associated with the present invention is very suitable for applying to an MD recording and reproducing device and an audio device having a teletext receiving capability.

What is claimed is:

1. A recording and reproducing apparatus provided with a teletext recording capability comprising:

a receiving means for receiving a teletext with text information multiplexed with an FM signal;

a signal processing means for performing audio signal processing based on the output of said receiving means;

a recording/reproducing means for recording an audio signal from said signal processing means in a disc with recording and reproducing capabilities and reproducing the audio signal from said disc;

a text-information decoding means for extracting the text information from the output of said receiving means;

a memory for temporarily storing the text information extracted by said text-information decoding means; and a selecting means for preselecting, before recording the audio signal in said disc, a portion of the text information to be read out from said memory, wherein, after recording the audio signal in said disc, a portion of the text information preselected by said selecting means is read out from said memory and recorded in a predetermined area of said disc as additional information to said audio signal.

2. A recording and reproducing apparatus provided with a teletext recording capability comprising:

- a receiving means for receiving a teletext with text information multiplexed with an EM signal;
- a signal processing means for performing audio signal
- a recording/reproducing means for recording an audio signal from said signal processing means in a disc with recording and reproducing capabilities and reproducing the audio signal from said disc;
- a text-information decoding means for extracting the text information from the output of said receiving means;
- a selecting means for preselecting a portion of the text information from said text-information decoding means during recording the audio signal in said disc; and
- a memory for temporarily storing only the text information preselected by said selecting means,
- wherein, after recording the audio signal in said disc, the text information read out from said memory is recorded in a predetermined area of said disc as additional information to said audio signal.

* * * * *